United States Patent [19]

Hey

[11] Patent Number: 5,620,154
[45] Date of Patent: Apr. 15, 1997

[54] THREE LINK FAILSAFE ENGINE MOUNT

[75] Inventor: Kenneth E. Hey, Seattle, Wash.

[73] Assignee: The Boeing Company, Seattle, Wash.

[21] Appl. No.: 434,443

[22] Filed: May 3, 1995

[51] Int. Cl.⁶ ................................................ B64D 27/26
[52] U.S. Cl. ........................... 244/54; 60/39.31; 248/554
[58] Field of Search ............................ 244/54; 60/39.31; 248/554, 555, 556

[56] References Cited

U.S. PATENT DOCUMENTS

| 4,055,041 | 10/1977 | Adamson et al. |        |
|-----------|---------|----------------|--------|
| 4,603,822 | 8/1986  | Chee.          |        |
| 4,717,094 | 1/1988  | Chee.          |        |
| 4,742,975 | 5/1988  | Pachomoff et al. | 244/54 |
| 4,997,145 | 3/1991  | Hodgkinson     | 244/54 |
| 5,078,342 | 1/1992  | Langley et al. | 244/54 |
| 5,174,525 | 12/1992 | Schilling.     |        |
| 5,238,206 | 8/1993  | Pachomoff      | 244/54 |
| 5,275,357 | 1/1994  | Seelen et al.  | 244/54 |
| 5,277,382 | 1/1994  | Seelen et al.  | 244/54 |
| 5,303,880 | 4/1994  | Cencula et al. | 244/54 |
| 5,320,307 | 6/1994  | Spofford et al. |       |
| 5,351,930 | 10/1994 | Gwinn et al.   |        |
| 5,474,258 | 12/1995 | Taylor et al.  |        |

Primary Examiner—Galen L. Barefoot
Attorney, Agent, or Firm—Christensen O'Connor Johnson & Kindness PLLC

[57] ABSTRACT

A fail-safe engine mount (19) that includes a first link (45), a second link (47), a third link (53), four upper connection locations (39a), (39b), (39c), (39d) on an upper fitting (31), and four lower connection locations (75a), (75b), (75c), (75d) on a clevis strip (73) of an engine casing (71), is disclosed. The upper fitting (31) includes structurally reinforced rib elements (35) which aid in controlling the alignment of the force vectors created by engine loads. The first link (45) connects the first upper connection location (39a) with the first lower connection location (75a). The second link (47) has a first arm (49) that connects the second lower connection location (75b) with the second upper connection location (39b). The second link (47) further includes a second arm (51) that connects the second upper connection location (39b) with the third lower connection location (75c). The second link (47) carries loads during a failure of either the first link (45) or the third link (53). The third link (53) has a first arm (55) that connects the third upper connection location (39c) with the fourth upper connection location (39d). The third link (53) further includes a second arm (57) arranged to connect the fourth upper connection location (39d) with the fourth lower connection location (75d). The first arm (55) of the third link (53) carries loads during a failure of the second link (47). The connections of the links to the upper fitting (31) and engine (11) are formed of pivotable pin and clevis joints, with spherical bearings (63). Under normal operating conditions, the first link (45), the first arm (49) of the second link (47), and the second arm (57) of the third link (53) work together to carry the vertical and horizontal/torsion loads of the engine (11). During a failed link operation, the remaining links work together to carry all loads.

12 Claims, 6 Drawing Sheets

| CONNECTION LOCATIONS | X COORDINATE | Y COORDINATE |
|---|---|---|
| FIRST UPPER 39a | 1.5631 | 3.6774 |
| SECOND UPPER 39b | 11.0663 | 4.4777 |
| THIRD UPPER 39c | 17.7963 | 3.2881 |
| FOURTH UPPER 39d | 20.5694 | 3.6774 |
| FIRST LOWER 75a | 0.0000 | 0.0000 |
| SECOND LOWER 75b | 7.2251 | 2.7487 |
| THIRD LOWER 75c | 14.7667 | 2.9289 |
| FOURTH LOWER 75d | 22.1326 | 0.0000 |

*fig.3.* ns in the '357 and '880 patents provide less horizontal
THREE LINK FAILSAFE ENGINE MOUNT

FIELD OF THE INVENTION

This present invention relates to engine mounts, and more particularly, to a fail-safe engine mount for securing a jet engine to an airplane.

BACKGROUND OF THE INVENTION

Airplane engines are typically mounted below an aircraft wing or near the tail section by an engine mount. Mounts are usually provided for both the forward portion of the engine and the aft portion of the engine, so as to distribute the engine load. Typical engine mounts include several components. One of the components is a generally planar upper fitting that has a mounting platform located along its upper edge that is used to attach the engine mount to a support structure of the aircraft, e.g., a wing strut or tail pylon. Multiple clevises are located on the lower edge of the upper fitting and also along a portion of an engine casing. Multiple links, pinned in the clevises of both the upper fitting and the engine casing, connect the engine to the support structure. Similar engine mounts of this type are used at both the forward and aft portions of the engine.

Engine mounts are designed to handle a variety of loads, during all phases of flight. The loads include vertical loads (the weight of the engine plus maneuver loads), axial loads (caused by the engine's thrust), side loads (caused by wind buffeting, for example), and torsion loads (caused by the rotary operation of the engine, or by the loss of a turbine blade). An engine mount must also accommodate thermal expansion and contraction of the engine relative to the mount. The effect of thermal expansion and contraction is most significant during cruise phase. During cruise, thermal expansion and contraction can cause an appreciable shift in the direction of loads acting on an engine mount.

Almost all airplane engine mounts are designed to be fail-safe, i.e., to prevent the engine from separating from the airplane. Fail-safe operation is provided by a secondary, or backup, load-carrying system. Two types of secondary systems are common. The first type utilizes components of the thrust reverser (such as the translating cowl) to carry engine loads. The second type utilizes catcher links placed within the engine mount itself. Catcher links are additional links in the engine mount that are typically unloaded during normal operation. Should a primary (i.e., non-catcher) link fail, the catcher links are capable of cooperating with the remaining unfailed links to carry engine loads. Link failures may result from many causes, including failure of pins or clevises; broken, deformed, missing, or mis-installed links; sheared pins; etc.

Between the two types of secondary systems, the thrust reverser system is the more widely used approach. On most airplanes, the use of catcher links is a more efficient solution, because they require relatively much less weight and space. Currently, relatively few catcher link engine mounts are known, and of these, not many describe three-link systems.

U.S. Pat. No. 5,275,357 (hereinafter referred to as "'357") describes a three-link system, where the center link is the catcher link. The center link carries no load during normal operations, due to an oversized hole where the center link is attached to the engine casing. U.S. Pat. No. 5,303,880 (hereinafter referred to as "'880") is similar to the device of the '357 patent, but with the addition of replaceable bushings. Although the devices disclosed in these two patents have three links, the systems are entirely different than the present invention. The most distinguishing difference is that the links in the '357 and '880 patents provide less horizontal and torsion load carrying capability than in the present invention. This is because the '357 and '880 devices do not have a dedicated horizontal and torsion load carrying member. The operation of the catcher link during a failed first or second link also produces a failure-mode load-couple (i.e., span of engine load contact points) that is smaller than the present invention. While the devices of the '357 and '880 patents appear sufficient, it is beneficial to have as large a span between the engine load contact points as possible during a failed link condition. These systems are also relatively tall, which makes them unusable on certain low-winged aircraft such as the Boeing 737.

U.S. Pat. No. 5,078,342 (hereinafter referred to as "'342") also describes a three-link system, where the center link is the catcher link. The center link includes an arm that carries horizontal load during normal operations. A second arm of the catcher link is unloaded during normal operations due to an oversized hole therein. Although the device of the '342 patent has three links, it does not fully accommodate the horizontal and torsion loads during all failed link conditions. In particular, certain link failures are provided with only a torsion stop (i.e., two abutting metal faces), as opposed to an actual catcher link. Torsion stops tend to wear very quickly, and once worn, they are difficult or impossible to repair. Another disadvantage of torsion stops is that during failed link conditions, the torsion stops could shear themselves off due to the axial thermal growth of the engine. In addition, the device of the '342 patent is symmetrical, requiting that the strut and engine be hung normal to the ground in order to limit the engagement of the stops. However, the present invention is not sensitive to angle and can be hung other than normal to the ground (such as normal to the wing). The catcher link in the '342 device also has a failure-mode load-couple disadvantage, as described above regarding devices of the '357 and '880 patents.

Thus, there exists a need for a superior fail-safe engine mount that provides link load carrying capability in all directions during normal and failed link operations. The ideal mount should be compact in height to provide greater ground clearance if used with an underwing engine, and compact in width in order to not significantly reduce bifurcation flow. The mount, however, should provide as wide a load-couple as possible during failed link conditions. The mount should not have any loose catcher links which vibrate and wear. The mount should provide adequate vertical and horizontal load beating capability in the event of a single link failure, should be lightweight, and should allow installation of a vibration isolator if needed. As will be appreciated by the following description, the present invention is directed to providing such a superior fail-safe engine mount.

SUMMARY OF THE INVENTION

In accordance with the present invention, a fail-safe engine mount for attaching a jet engine to an aircraft support structure that efficiently distributes engine loads among several of the mount links during normal operation, as well as among the remaining links during a single link failure, is provided. Engine mounts formed in accordance with the invention can be attached to various locations on an airplane (e.g., under the wing or to the tail section) or on an engine (e.g., at the forward portion of the engine or at the aft portion of the engine), with only slight modification to the sizings of the mount components being required. An engine mount formed in accordance with the present invention includes an upper fitting, a plurality of links, and a clevis strip. The upper fitting includes a mounting platform for attaching the upper fitting to a support structure. The clevis strip is attached to the engine casing, and the links connect the upper fitting to the clevis strip. The upper fitting further includes a rib section comprised of structurally reinforced rib elements located adjacent the mounting platform. The rib elements intersect one another to form structural nodes capable of carrying the applied stresses and loads of the engine. In the described embodiment, the engine mount is relatively compact in height, but may be increased in height in order to provide room for an engine vibration isolator should the need arise.

In accordance with further aspects of this invention, the plurality of links include first, second, and third links. The first link is positioned at one side of the engine mount and is generally a straight, substantially vertically oriented link. The first link connects a point on the engine casing with a point on the upper fitting. The second link has a first arm arranged to connect a point on the engine casing with a point on the upper fitting during normal operations and a second arm arranged to connect the point on the upper fitting with another point on the engine casing. The second arm of the second link is unloaded during normal operations and loaded during a failure of either the first or third links. The third link includes a first arm arranged to connect a point on the upper fitting with another point on the upper fitting. The first arm of the third link is unloaded during normal operations and loaded during a failure of either the first or second links. The third link further includes a second arm extending from the connection of the first arm of the third link to the upper fitting, to a point on the engine casing. The second arm of the third link is loaded during normal airplane operations.

In accordance with still further aspects of this invention, the connections of the links to the lower edge of the upper fitting and to the engine casing are formed of pin-and-clevis joints with pivotable spherical bearings. The connections are positioned so that all links lie in approximately the same vertical transverse plane relative to the airplane during the cruise phase of flight.

In accordance with yet further aspects of this invention, during normal operation, the first and third links carry the majority of the vertical loads, while the first arm of the second link carries most of the horizontal loads. Torsion loads are shared by all three links. If the first link fails, the second arm of the second link works to absorb some of the load previously carded by the first link. If the second link fails, the first arm of the third link absorbs some of the load previously carded by the second link. If the third link fails, the second arm of the second link absorbs some of the load previously carried by the third link. In each of these failure conditions, only one of the catcher links engages, keeping the engine mount statically determinate. In this way, all vertical and horizontal loads are carried if a link fails, preventing separation of the engine from the aircraft.

The present invention provides a new and distinctly better engine mount. If any link fails, the vertical, horizontal, and torsion loads once carried by the failed link are efficiently distributed among the remaining links. The entire engine mount is relatively compact, thus making optimal use of the limited amount of space available in jet airplanes and providing greater ground clearance if used on an underwing engine. The present invention has a relatively wide load-couple during a failed link condition. The links are configured so that during normal operations the catcher links are unloaded, which eliminates unnecessary wear. In addition, there are no loose links to vibrate, thus component wear is reduced.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 3 is a table of the coordinates of connection locations for one actual embodiment of the present invention;

DETAILED DESCRIPTION OF THE PREFERRED EMBODIMENT

Figure 1:
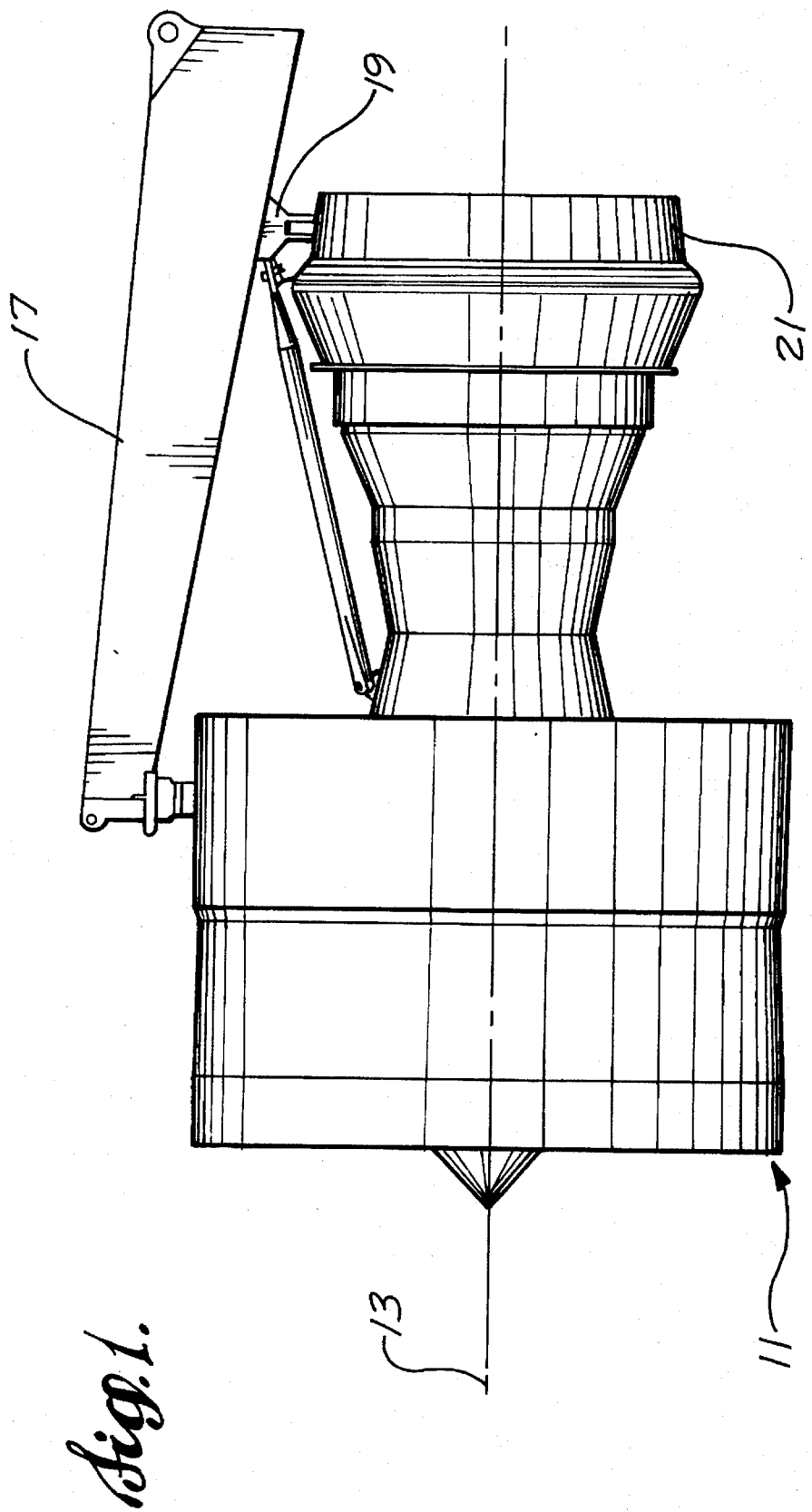
FIG. 1 is a side schematic view of a conventional aircraft engine mounted to a pylon below an aircraft wing by an engine mount formed in accordance with the present invention.

FIG. 1 is a side schematic view of a conventional aircraft jet engine 11 supported by a pylon 17 located below an aircraft wing. The engine 11 is attached to the pylon 17 by an engine mount 19 formed in accordance with the present invention. More specifically, the engine mount 19 is attached to an aft portion of the engine 11 near the turbine rear frame 21. Thus, the engine mount 19 depicted in FIG. 1 is an aft engine mount.

While FIG. 1 illustrates an aft engine mount, it is to be understood that engine mounts formed in accordance with the teachings of the present invention may be used in a variety of engine mounting locations. For example, they can be used as a forward or aft mount, or both. They can be used to mount the engine either under the wing or to the tail section of the aircraft. FIG. 1 is meant to be illustrative, not limiting. In this regard, the following written description of a specific engine mount for use in the position shown in FIG. 1 should also be considered as illustrative and not limiting. The precise position selected to use an engine mount formed in accordance with the present invention may require modification of the sizings of the mount components for that particular application. These modifications depend upon a variety of factors known to those skilled in the art of engine mounting, e.g., engine size, anticipated loads, aerodynamic considerations, etc.

To facilitate understanding of the invention, the terminology in the description below refers to the location of the engine mount components relative to the orientation of the FIGURES. The terminology and illustrative FIGURES should not be construed to limit the present invention to only underwing, aft engine mounts.

Figure 2:
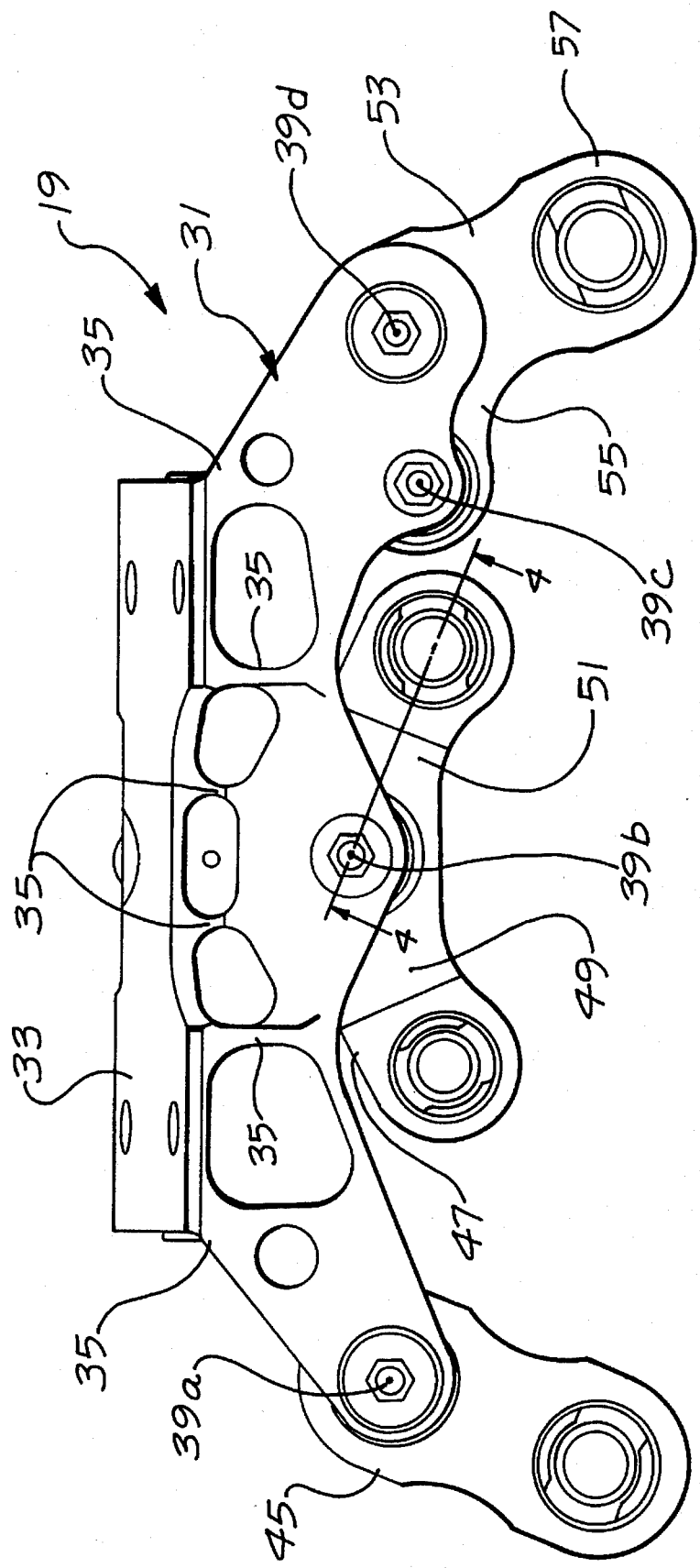
FIG. 2 is a rear view of a fail-safe engine mount formed in accordance with the present invention, as seen when looking forward relative to the airplane.

FIG. 2 is a rear view of a fail-safe aft engine mount 19 formed in accordance with the present invention and suitable for use as in FIG. 1, as seen by an observer standing behind the engine 11. In general, the engine mount 19 includes an upper fitting 31 and three links 45, 47, 53. The upper fitting 31 is attached to the pylon 17 (shown in FIG. 1) or some other airplane support structure. The links 45, 47, 53 are arranged to connect four connection locations 39a, 39b, 39c, 39d on the upper fitting 31 with four connection locations 75a, 75b, 75c, 75d on a clevis strip 73 which is attached to an engine casing 71 (shown in FIG. 5). Attachments of the links 45, 47, 53 to the upper fitting 31 and to the engine casing 71 at the various connection locations are accomplished using pin-and-clevis joints. During operation, the links 45, 47, 53 support the vertical and horizontal/torsion loads of the engine 11. Should a link fail, the remaining links are arranged to completely assume the loads previously carried by the failed link. The material used for the upper fitting 31, links 45, 47, 53, pins and clevises should be preferably Inconel, titanium, or stainless steel.

In more detail, the upper fitting 31 has a mounting platform 33 formed along an upper surface for attaching the engine mount 19 to the pylon 17. The mounting platform 33 includes a plurality of bolt holes for accepting a bolt arrangement (not shown) that attaches the platform 33 to the pylon 17. The bolts transfer the vertical loads carded by the aft engine mount 19 to the pylon 17. The mounting platform 33 also includes one or more shear pin bores for accepting a shear pin arrangement (not shown) that also attaches the platform to the pylon 17. The shear pin arrangement transfers the side and thrust loads carded by the aft engine mount 19 to the pylon 17.

The upper fitting 31 further includes a short rib section located below the mounting platform. The rib section includes structurally reinforced areas, or ribs 35, that carry engine loads between the mounting platform 33 and the links 45, 47, 53. The ribs 35 aid in controlling the alignment of the force vectors created by engine loads. Sufficient numbers of ribs 35 are included to ensure that the engine loads are fully supported. Because engine loads are transmitted primarily along the ribs 35, the areas in-between the ribs may be pocketed to reduce the weight of the upper fitting 31. Although the embodiment of the present invention of the FIGURES shows a rib section that is relatively compact, the height of the rib section may be increased in ways apparent to those skilled in the art, to allow an engine vibration isolator to be installed, should the need arise.

Along the lower edge of the rib section are the four upper connection locations: one 39a for the first link 45; one 39b for the second link 47; and two 39c, 39d for the third link 53. The four upper connections 39a, 39b, 39c, 39d are located in a common plane lying generally transverse to the longitudinal axis 13 of the engine 11. As shown best in FIG. 4, each upper connection location includes a clevis 41 with a pin hole 44a, 44b bored through each of two tines 42a, 42b of the clevis. One end of each of the links 45, 47, 53 is positioned between the clevis tines 42a, 42b and is held in place by a clevis pin 43 that passes through the pin hole 44a in one of the clevis tines 42a, through a hole 61 in the end of the link, and then through the pin hole 44b in other clevis tine 42b. This arrangement is described in further detail below.

Returning to FIG. 2, the contour of the lower edge of the upper fitting 31 is preferably determined by connecting lower arcs formed about each clevis pin hole, with simple curves. The lower arcs are formed by rotating a radius at each pin hole that is larger than the radius of the pin hole. Care should be taken to allow sufficient structure in the clevis tines 42a, 42b around each of the clevis pin holes 44a, 44b to carry the expected loads. The clevises 41 are formed by machining, preferably, Inconel, titanium, or stainless steel; and are shaped such that the ends of the links 45, 47, 53 will fit easily into their respective clevises 41 during all phases of flight. Care should be taken to ensure that adequate space for the links is available during both normal and failed-link operations, as discussed below.

Figure 4:
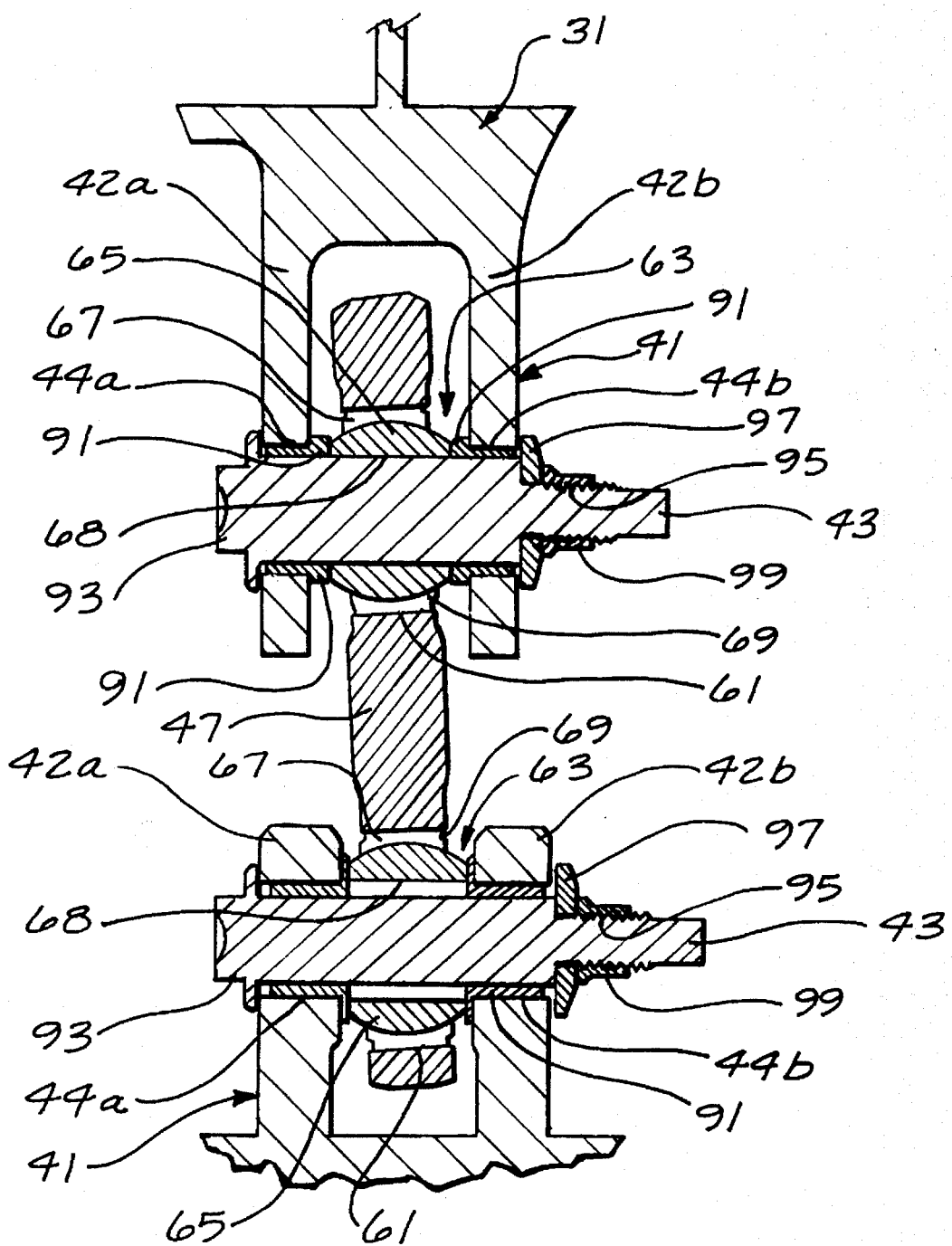
FIG. 4 is a cross-sectional side view taken along line 4—4 of FIG. 2.
Figure 5:
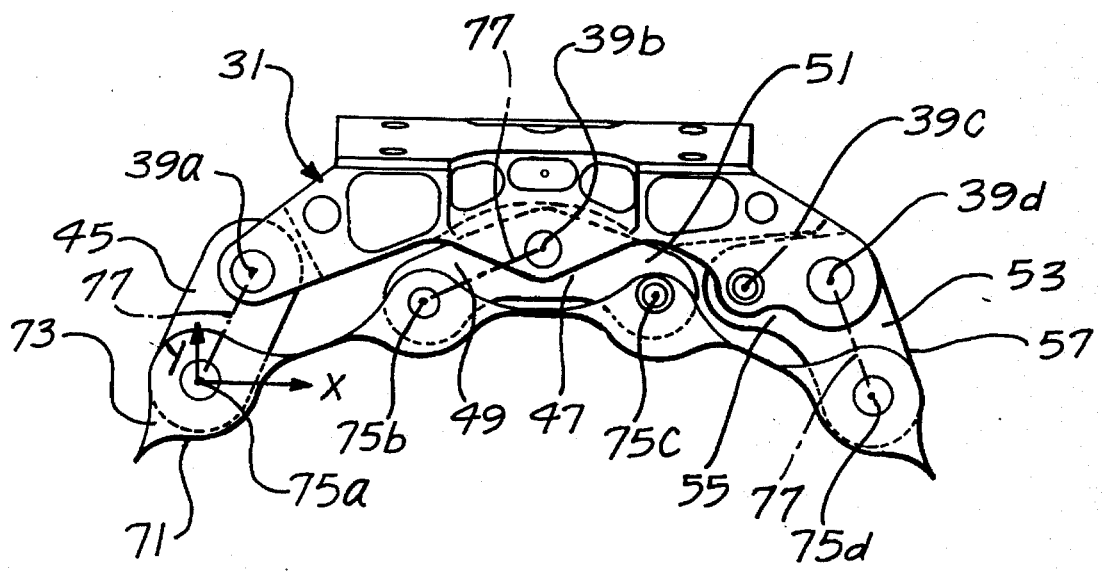
FIG. 5 is a schematic view of the fail-safe aft engine mount of FIG. 2 during normal operation.

Referring to FIG. 5, the clevis strip 73 is located along the radial upper edge of the engine case 71. The clevis strip 73 lies in a plane generally transverse to the longitudinal axis 13 of the engine 11, generally in-line with the plane formed by the upper connection locations. The clevis strip 73 contains four lower connection locations: one 75a for the first link 45; two 75b, 75c for the second link 470; and one 75d for the third link 53. Each lower connection location 75a, 75b, 75c, 75d includes a clevis 41 with a clevis pin hole 44a, 44b bored through each of the tines 42a, 42b of the clevis (as shown in FIG. 4). The other ends of the links 45, 47, 53 are each positioned between the tines 42a, 42b of a clevis and are held in place by inserting clevis pins 43 through both the tines 42a, 42b of the related clevis and through a hole 61 in the end of the link. The outer contour of the clevis strip 73 is determined by connecting lower arcs formed about each clevis pin hole, with simple curves. The lower arcs are formed by rotating a radius at each pin hole 44a, 44b that is larger than the radius of the pin hole. Care should be taken to allow sufficient structure around each of the clevis pin holes 44a, 44b to carry the expected loads.

The following discussion of the three links 45, 47, 53 details three major aspects of the links. The first aspect is the general shape and location of the links relative to the upper fitting 31 and to the engine casing 71. The second aspect is the use of pin-and-clevis joints to attach the links to the upper fitting 31 and the engine casing 71. The third aspect is the operation of the links during normal operation and when a link fails.

The three links 45, 47, 53 are installed side-by-side in a generally common plane lying transverse to the longitudinal axis 13 of the engine 11. The first link 45 is positioned on the left side of the aft engine mount 19, at roughly a 30° clockwise angle from the vertical, as shown in FIG. 2. The first link 45 is substantially straight and fans outwardly from one end of the upper fitting 31. The first link 45 contains upper and lower link holes with spherical bearings, one hole at each end of the link 45. The upper hole of the first link 45 is connected to the upper fitting 31 at the first upper connection location 39a in the previously described pin-and-clevis manner. A more detailed description of a pin-and-clevis connection is given below. The lower hole of the first link 45 is attached to the engine casing 71 at the first lower connection location 75a, again using a pin-and-clevis joint.

The second link 47 has a dog leg shape and includes a first arm 49 and a second arm 51. The arms 49, 51 are of the same general length and define an obtuse angle of roughly 145°. Three link holes are provided, one at the intersection of the two arms 49, 51 and one at each of the outer ends of the arms. The hole in the outer end of the first arm 49 is attached to the engine casing 71 at the second lower connection location 75b, which is located inwardly (relative to the airplane) of the first lower connection location 75a. The hole at the intersection of the two arms 49, 51 is connected to the upper fitting 31 at the second upper connection location 39b, which is located inwardly of the first upper connection location 39a. The hole in the outer end of the second arm 51 is connected to the engine casing 71 at the third lower connection location 75c, which is located inwardly of the second lower connection location 75b. All of the second link connections are pin-and-clevis joints.

The third link 53 also has a dog leg shape and includes a first arm 55 and a second arm 57. The arms 55, 57 are of the same general length and define an angle of roughly 105°. Three link holes are provided, one at the intersection of the two arms 55, 57 and one at each of the outer ends of the arms. The hole in the outer end of the first arm 55 is connected to the upper fitting 31 at the third upper connection location 35c, which is located inwardly of the second upper connection location 35b. The hole at the intersection of the two arms 55, 57 is connected to the upper fitting 31 at the fourth upper connection location 39d, which is located inwardly of the third upper connection location 39c. The hole in the outer end of the second arm 57 is connected to the engine casing 71 at the fourth lower connection location 75d, which is located inwardly of the third lower connection location 75c. All of the third link connections are pin-and-clevis joints.

One particular embodiment of the relative locations of the upper and lower connections on an engine mount formed in accordance with the present invention is described in the table of FIG. 3. The values in FIG. 3 are for use with a CFM156-7 underwing aft engine mount, as used on (but not limited to) a Boeing 737 Next Generation aircraft (–600/–700/–800). As will be understood by those skilled in the art, slight variations may be made to this particular embodiment if the present invention is to be used on an engine other than the CMF56-7 underwing engine. The x and y coordinate system is shown in FIG. 5 centered at the first lower connection location 75a. The locations listed in FIG. 3 will vary depending on the particular engine application to which a mount formed in accordance with the present invention is being applied.

The following description of the pin-and-clevis joint of the first arm 49 of the second link 47 is illustrative of all of the pin-and-clevis joints at both the upper and lower connection locations. Exceptions are noted. FIG. 4 is a cross-sectional side view of the second arm 51 of the second link 47 taken along line 4—4 of FIG. 2. The pin-and-clevis joint at the second upper connection location 39b comprises the two previously described clevis tines 42a, 42b within which the second link 47 is held by a clevis pin 43. The clevis pin 43 passes through a circular clevis hole 44a located in one of the clevis tines 42a, through a hole 61 in the second link 47, and a circular hole 44b located in the other clevis tine 42b. The third lower connection location pin-and-clevis joint is configured similarly.

Each link hole 61 in the links 45, 47, 53 includes a spherical bearing 63. The spherical bearing comprises a bearing ball 65 and a bearing race 67. The bearing race 67 is swaged onto the link hole 61 by means of a lip 69. The bearing ball 65 is positioned in the bearing race 67 and includes a bearing ball hole 68 through its center. The clevis pins 43 pass through the bearing ball holes 68. The spherical bearings 63 allow the link to rotate relative to the clevis.

As shown in FIG. 4, bushings 91 are located in the pin holes 44a, 44b located in the clevis tines 42a, 42b. The bushings 91 extend from the bearing ball 65 to almost the outer surface of the clevis 41. The bushings 91 reduce the vibration of the link and clevis pins. The clevis tines 42a, 42b; bearing ball 65; bearing race 67; and bushings 91 of all of the clevis assemblies are sized to fit closely together.

The clevis pins 43 include a head 93 located at one end and threads 95 located at the other end. When inserted in the clevis tines 42a, 42b, the size of the clevis pin 43 is long enough to allow the threaded portion 95 to extend past the clevis tines 42a, 42b. An end cap 97 and nut 99 attached to the threaded end of the clevis pin 43 firmly secure the clevis pin 43 in the clevis 41.

In one actual embodiment of the invention, the diameter of the clevis pin 43 and the diameter of the bearing hole 68 are substantially the same for the clevises 41 at the first, second, and fourth upper connection locations 39a, 39b, 39d and at the first, second, and fourth lower connection locations 75a, 75b, 75d. At the third upper connection location 39c and the third lower connection locations 75c, the diameter of the bearing ball hole 68 is slightly larger than the radius of the clevis pin 43. In this embodiment of the invention the diametric gap between the clevis pin 43 and bearing ball hole 68 of the third lower connection location 75c is approximately 0.310 inches. The diametric gap between the clevis pin 43 and bearing ball hole 68 of the third upper connection location 39c is approximately 0.200 inches. As discussed in more detail below, the diametric gaps ensure that the links will float around the clevis pin and will not contact the clevis pin during normal operation. Obviously, these dimensions are to be taken as exemplary, since other dimensions may be better for other applications and embodiments of the present invention.

All of the link holes 61 are circular and are formed about an axis normal to the outer surface of each of the links 45, 47, 53. The link holes 61 are sized to fit closely against the bearing race 67, which is designed to fit closely about the bearing ball 65. The links are positioned within the clevises 41 at a slight tilt. The precise tilt amount will depend upon the amount of movement expected due to thermal expansion at a particular connection location during flight. Even though the links 45, 47, 53 may be tilted at a different angle, during the cruise phase of flight, the movement of the engine 11 will cause all links to become generally vertically oriented and transversely aligned relative to the longitudinal axis 13 of the engine 11.

FIG. 5 is a schematic view of the fail-safe aft engine mount 19 of FIG. 2, showing the position of the links 45, 47, 53 during normal operations. As shown in FIG. 5, the links 45, 47, 53 and clevis pins 43 are sized and placed within the aft engine mount 19 so that under normal loading conditions, the first link 45 and the second arm 57 of the third link 53 carry substantially all of the vertical loads, first arm 49 of the second link 47 carries substantially all of the horizontal loads, the second arm 51 of the second link 47 carries no loads, and the first arm 55 of the third link 53 carries no loads.

The upper and lower connection locations are shown by a dot in the center of each of the circles of FIG. 5. The dots also indicate the general axial center of the clevis pin 43. A single circle surrounds the first, second and fourth upper connection locations 39a, 39b, 39d and the first, second, and fourth lower connection locations 75a, 75b, 75d indicating that the clevis pin 43 and beating ball hole 68 at that connection location are sized to fit one another closely, as described above. At the third upper connection location 39c and the third lower connection location 75c there are two circles indicating that the beating ball hole diameter is larger than the clevis pin radius. The large circle represents the bearing ball hole 68 and the smaller circle represents the clevis pin 43 diameter. The lines 77 connecting the connection locations of the links 45, 47, 53 are straight and show that the loading between two connection locations follows a straight path through a link. Therefore, no link is subjected to a bending load in a non-failure condition.

Figure 6:
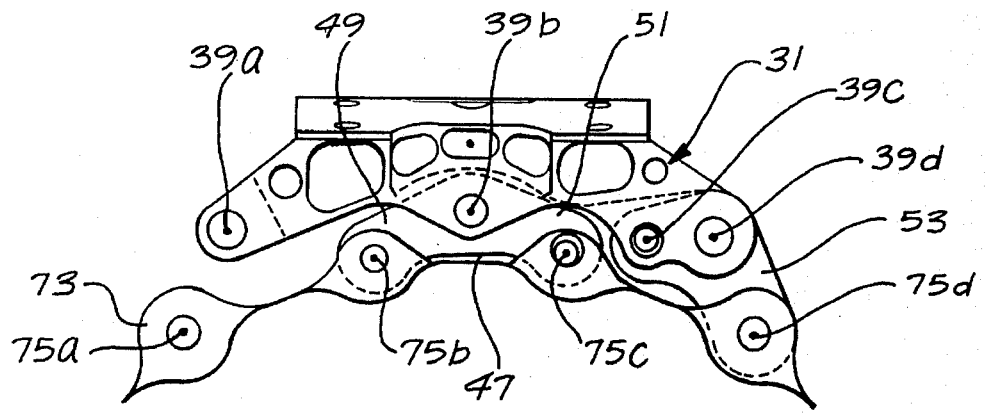
FIG. 6 is a schematic view of the fail-safe aft engine mount of FIG. 2 showing what occurs when a first link fails.

FIG. 6 is a schematic view of the aft engine mount 19 of FIG. 2, showing the position of the second and third links 47, 53 during a failed first link 45 condition. If the first link 45 fails, then the bearing ball 65 of the second arm 51 of the second link 47 will be forced into contact with the clevis pin 43 at the clevis joint of the third lower connection location 75c (as shown in FIG. 6). This allows the second link 47 to work with the remaining third link 53 to absorb the loads previously carded by the failed first link 45. The clevis pin 43 of the clevis joint at the third upper connection location 39c moves closer to the bearing ball hole 68 in the first arm 55 of the third link 53 (as shown in FIG. 6). However, a connection is not made.

Figure 7:
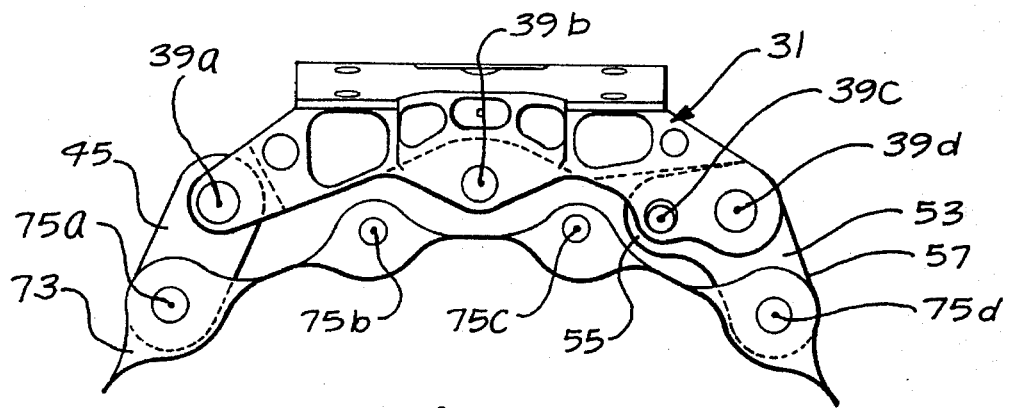
FIG. 7 is a schematic view of the fail-safe aft engine mount of FIG. 2 showing what occurs when a second link fails.

FIG. 7 is a schematic view of the aft engine mount 19 of FIG. 2, showing the position of the first and third links 45, 53 during a failed second link 47 condition. If the second link 47 fails, then the bearing ball 65 of the first arm 55 of the third link 53 will be forced into contact with the clevis pin 43 at the clevis joint of the third upper connection location 39c. The third link 53 works with the first link 45 to absorb the loads previously carded by the failed second link 47.

Figure 8:
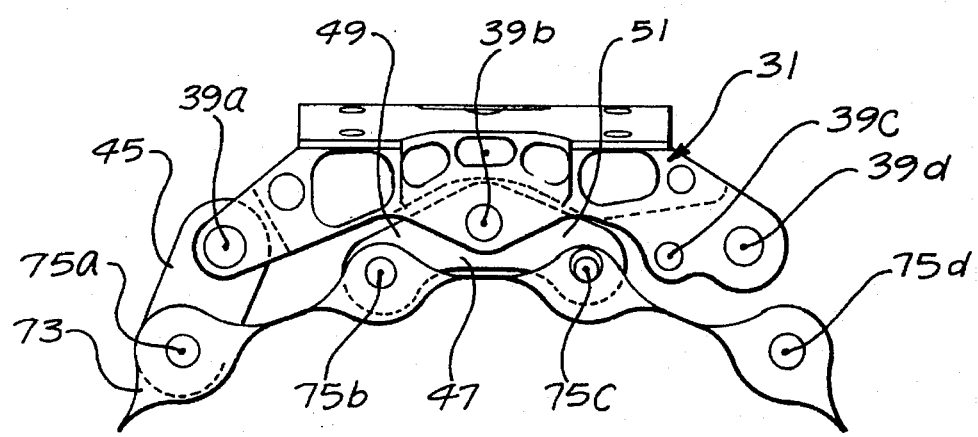
FIG. 8 is a schematic view of the fail-safe aft engine mount of FIG. 2 showing what occurs when a third link fails.

FIG. 8 is a schematic view of the aft engine mount 19 of FIG. 2, showing the position of the first and second links 45, 47 during a failed third link 53 condition. If the third link 53 fails, then the bearing ball 65 of the second arm 51 of the second link 47 will be forced into contact with the clevis pin 43 at the clevis joint of the third lower connection location 75c. This allows the second link 47 to work with the remaining first link 45 to absorb the loads previously carried by the failed third link 53.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A fail-safe engine mount for attaching an engine casing of a jet engine to a support structure on an airplane, comprising:

(a) an upper fitting attachable to an airplane support structure, the upper fitting including a lower edge having first, second, third, and fourth upper connection locations located in a plane lying generally transverse to the longitudinal centerline of the engine;

(b) a clevis strip attached to the outer periphery of an engine casing in a plane lying generally transverse to the longitudinal centerline of the engine, the clevis strip including first, second, third, and fourth lower connection locations located in a plane lying generally transverse to the longitudinal centerline of the engine;

(c) a substantially straight first link connected to the upper fitting at the first upper connection location and connected to the clevis strip at the first lower connection location;

(d) a second link including a first arm and a second arm, the first arm connected to the clevis strip at the second lower connection location and connected to the upper fitting at the second upper connection location, the second arm defining an angle of roughly a 145° angle with respect to the first arm, the second arm further connected to the clevis strip at the third lower connection location; and (e) a third link including a first arm and a second arm for stabilizing the first arm, the second arm connected to the upper fitting at the fourth upper connection location and connected to the clevis strip at the fourth lower connection location, the first arm defining an angle of roughly 105° with respect to the second arm, the first arm further connected to the upper fitting at the third upper connection location.

2. A fail-safe engine mount according to claim 1, wherein the connections of the links to the upper fitting upper connection locations and to the clevis strip lower connection locations are pin-and-clevis joints.

3. A fail-safe engine mount according to claim 2, further including spherical bearings at the pin-and-clevis joints, positioned so that all links lie in generally the same transverse plane relative to the longitudinal centerline of the engine during the normal cruise operation of flight.

4. A fail-safe engine mount according to claim 1, wherein the upper fitting further comprises structurally reinforced portions.

5. A fail-safe engine mount according to claim 1, wherein the upper fitting further comprises a mounting platform suitable for connection to an airplane support structure.

6. A fail-safe engine mount according to claim 1, wherein the second arm of the second link is arranged to be unloaded during normal airplane operation.

7. A fail-safe engine mount according to claim 6, wherein the connection of the second arm of the second link to the engine casing is comprised of a pin-and-clevis joint having spherical bearings with a diametric gap of roughly 0.310 inches.

8. A fail-safe engine mount according to claim 1, wherein the second arm of the second link is arranged to work with the first link to carry the engine loads should the third link fail.

9. A fail-safe engine mount according to claim 1, wherein the first arm of the third link is positioned to be unloaded during a failure of the first link.

10. A fail-safe engine mount according to claim 1, wherein the first arm of the third link is positioned to be unloaded during normal airplane operation.

11. A fail-safe engine mount according to claim 10, wherein the connection of the first arm of the third link to the upper fitting casing is comprised of a pin-and-clevis joint having spherical bearings with a diametric gap of roughly 0.200 inches.

12. A fail-safe engine mount according to claim 1, wherein the first arm of the third link is arranged to work with the first link to carry the engine loads should the second link fail.

* * * * *